| United States Patent [19] | [11] Patent Number: 4,936,195 |
|---|---|
| Uyama | [45] Date of Patent: Jun. 26, 1990 |

[54] VACUUM BRAKE BOOSTER SHELL EXTENSION WITH RADIALLY INWARDLY PROJECTING ANNULAR PORTION FOR VALVE KEY CONTACT

[75] Inventor: Shintaro Uyama, Saitama, Japan

[73] Assignee: Jidosha Kiki Co., Ltd., Tokyo, Japan

[21] Appl. No.: 263,619

[22] Filed: Oct. 27, 1988

[30] Foreign Application Priority Data

Oct. 30, 1987 [JP] Japan .................. 62-166696[U]

[51] Int. Cl.⁵ ................................................ F15B 9/10
[52] U.S. Cl. ..................................................... 91/369.3
[58] Field of Search ............... 91/369.1, 369.2, 369.3, 91/376 R

[56] References Cited

U.S. PATENT DOCUMENTS

| 4,472,997 | 9/1984 | Ohmi .................................. 91/376 R |
| 4,534,270 | 8/1985 | Nishii .............................. 91/369.2 X |
| 4,587,885 | 5/1986 | Boehm et al. ....................... 91/376 R |
| 4,643,076 | 2/1987 | Satoh ............................. 91/376 R X |
| 4,663,757 | 1/1987 | Kubota ............................ 91/369.2 X |
| 4,664,016 | 5/1987 | Tobisawa et al. ................... 91/369.2 |
| 4,747,336 | 5/1988 | Uyama ............................... 91/376 R |
| 4,757,748 | 7/1988 | Kawasumi et al. ................... 91/369.2 |
| 4,803,912 | 2/1989 | Nishii .............................. 91/369.2 |
| 4,846,047 | 7/1989 | Uyama et al. .................... 91/376 R X |

FOREIGN PATENT DOCUMENTS

| 198158 | 12/1982 | Japan . |
| 2065809A | 7/1981 | United Kingdom . |
| 2064690B | 6/1983 | United Kingdom . |
| 2148427 | 5/1985 | United Kingdom ............. 91/376 R |

Primary Examiner—Robert E. Garrett
Assistant Examiner—George Kapsalas
Attorney, Agent, or Firm—Flynn, Thiel, Boutell & Tanis

[57] ABSTRACT

A brake booster includes a key member coupled to a valve plunger. When the booster is inoperative, the key member is brought into abutment against an inner wall surface of a shell to limit a free retracting movement of a valve plunger and its connected input shaft so that a lost stroke of the input shaft can be reduced when the brake is operative for the next time. According to the invention, a shell includes a cylindrical extension which is circumferentially and integrally formed with an annular bulge which extends radially inward, with a seal member disposed on the rear side of the annular bulge.

8 Claims, 1 Drawing Sheet

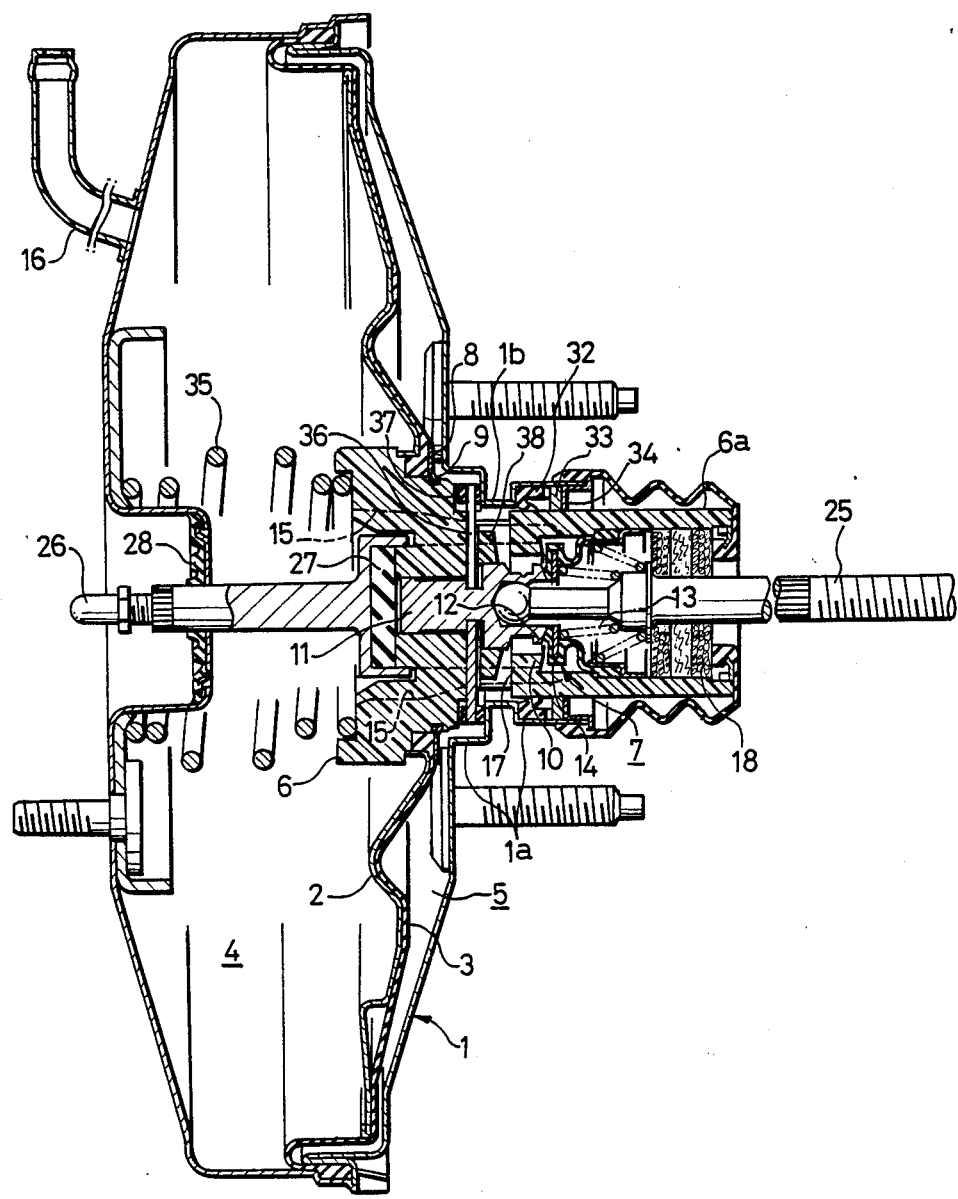

VACUUM BRAKE BOOSTER SHELL EXTENSION WITH RADIALLY INWARDLY PROJECTING ANNULAR PORTION FOR VALVE KEY CONTACT

BACKGROUND OF THE INVENTION

1. Field of the Invention

The invention relates to a brake booster, and more particularly, to a brake booster in which a key member which is mechanically coupled to a valve plunger is brought into abutment against an internal wall surface of a shell, for example, when the booster is inoperative, to thereby limit a free retracting movement of the valve plunger and an input shaft which is mechanically coupled therewith in order to reduce a lost stroke of the input shaft when the brake is applied for the next time.

2. Description of the Prior Art

A brake booster is known in the prior art which comprises a valve body slidably disposed within a shell, a valve mechanism received within the valve body, an input shaft mechanically coupled to a valve plunger which forms part of the valve mechanism to switch a flow path within the valve mechanism, and a key member which is mechanically coupled to the valve plunger, with the key member being brought into abutment against an internal wall surface of the shell to limit a free retracting movement of the valve plunger when the booster is inoperative, thereby reducing a lost stroke of the input shaft when the brake is applied for the next time.

It will be appreciated that a shell of a brake booster is generally formed with a cylindrical extension which is formed by a rear central portion of the shell to extend in a cylindrical form and to remain open. A rear cylindrical portion of a valve body slidably extends through the cylindrical extension of the shell to the outside thereof. A seal member is disposed within the cylindrical extension to maintain a hermetic seal between the extension and the cylindrical portion of the valve body. The key member mentioned above is disposed for abutment against an internal wall surface of the shell which is located radially outward of the cylindrical extension.

It is also known in the prior art to dispose the key member for abutment against a bearing which is disposed within the cylindrical extension to guide the rear cylindrical portion of the valve body or against a stop member which is disposed within the cylindrical extension, rather than against the internal wall surface of the shell at a location which is radially outward of the cylindrical extension (see Japanese Laid-Open Patent Application No. 198,158/1982).

However, when the key member is disposed for abutment against an internal wall surface of the shell at a location which is radially outward of the cylindrical extension, there must be a space for the provision of the seal member between the surface against which the key member abuts and the outer peripheral surface of the valve body, causing an increased length of the key member by a corresponding amount. This requires that the wall thickness be increased in order to secure a required strength, resulting in an increase in the weight and the axial length of the brake booster.

On the other hand, in an arrangement in which the key member is disposed for abutment against the bearing located within the cylindrical extension, the length of the key member can be reduced with a resulting reduction in the wall thickness and the weight. However, the abutment of the key member against the bearing may cause a degraded durability of the bearing. The provision of a stop member within the cylindrical extension is effective to prevent any reduced durability of the bearing, but results in an increased cost because of an added member.

SUMMARY OF THE INVENTION

In view of the foregoing, in accordance with the invention, the cylindrical extension of the shell is integrally formed with an annular bulge which extends radially inward around the circumference, with the seal member mentioned above disposed on the rear side of the annular bulge.

With this arrangement, the inner peripheral surface of the annular bulge ca be brought close to the cylindrical outer peripheral surface of the valve body, enabling the key member, with a reduced length, to be disposed for abutment against the annular bulge, to allow a reduction in the weight and the wall thickness of the key member as well as a reduction in the weight and the axial length of the brake booster. Since the annular bulge is integrally formed with the cylindrical extension of the shell, there is no added component, thus avoiding any increase in the cost.

Above and other objects, features and advantages of the invention will become apparent from the following description of an embodiment thereof with reference to an attached drawing.

BRIEF DESCRIPTION OF THE DRAWING

The drawing is a longitudinal section of an embodiment of the invention.

DETAILED DESCRIPTION OF THE PREFERRED EMBODIMENT

Referring to the drawing, the brake booster includes a shell 1 in which a power piston 2 is slidably disposed. A diaphragm 3 is applied to the back surface of the power piston 2 and the combination of the power piston 2 and the diaphragm 3 is effective to divide the interior of the shell 1 into a forwardly disposed, constant pressure chamber 4 and a rearwardly disposed, variable pressure chamber 5. An axial portion of the power piston 2 is integrally provided with a valve body 6 in which a valve mechanism 7, which switches a flow path, is received.

The inner periphery of the diaphragm 3 is supported by a retainer 8 which is fitted around the outer peripheral surface of the valve body 6. A disengagement of the retainer 8 from the valve body is prevented by engaging the inner periphery of the retainer 8 with an annular groove 9 formed in the outer peripheral surface of valve body 6.

The valve mechanism 7 comprises a first valve seat 10 formed on the valve body 6, a second valve seat 12 formed on a valve plunger 11, and a valve element 14 which can be seated upon either valve seat 10 or 12 under the resilience of a spring 13 from the rear side of the power piston 2 or from the right side, as viewed in the drawing. A region located outside a seal defined between the first valve seat 10 and the valve element 14 communicates with the constant pressure chamber 4 through a passage 15 formed in the valve body 6, and the chamber 4 communicates with a source of negative pressure such as an intake manifold of an engine through a piping 16 mounted on the shell 1 which serves introducing a negative pressure.

On the other hand, a region located intermediate a seal defined between the first valve seat 10 and the valve element 14 and another seal defined between the second valve seat 12 and the valve element 14 communicates with the variable pressure chamber 5 through a passage 17 formed in the valve body 6. A region located inside a seal defined between the second valve seat 12 and the valve element 14 communicates with the atmosphere through a filter 18.

The valve plunger 11 which forms the valve mechanism 7 is connected to an input shaft 25 which is in turn mechanically coupled to a brake pedal, not shown. The front end face of the valve plunger 11 is disposed in opposing relationship with a reaction disc 27 which is received within a recess formed in one end of an output shaft 26. The output shaft 26 extends through a seal member 28 to project externally of the shell 1 for connection with a piston of a master cylinder, not shown.

A rear central portion of the shell 1 is formed with a cylindrical extension 1a which projects axially rearward and which is integrally formed with an annular bulge 1b extending radially inward from its circumference, at a position intermediate the axial length of the extension 1a and slightly offset toward the front side. The annular bulge 1b is formed so that its internal peripheral surface is located as close as possible to the outer peripheral surface of the valve body 6. In the embodiment shown, the axial extension 1a has an inner diameter in its region located forward of the annular bulge which is greater than the inner diameter thereof at a location rearward of the annular bulge 1b, but it should be understood that the both regions may have an equal diameter.

Disposed within the cylindrical extension 1a in a region located rearward of the annular bulge 1b are a seal member 32 which is disposed in sliding contact with a cylindrical portion 6a of the valve body 6 for maintaining a hermetic seal against the exterior, and a bearing 33 also disposed in sliding contact with the cylindrical portion 6a to support it, in a sequential manner, as viewed from the front side. The seal member 32 and the bearing 33 are secured in place by a retainer 34 which is fitted into the cylindrical extension 1a from the rear side of the bearing 33.

In the described arrangement, the power piston 2 and the valve body 6 are normally maintained in their inoperative position shown by means of a return spring 35. In such inoperative condition, a key member 36, which is used to prevent the withdrawal of the valve plunger 11 from the valve body 6, is disposed in abutment against the left end face of the annular bulge 1b to limit a free movement of the valve plunger 11 to the right with respect to the valve body 6 so that when the input shaft 25 and the valve plunger 11 are operated for the next time, a switching of a fluid circuit occurs immediately by means of the valve mechanism 7.

It will be noted that resilient members 37 as formed of rubber are attached to the opposite ends of the key member 36 so that the key member 36 abut against the left end face of the annular bulge 1b through the interposed resilient members 37, thus preventing any striking sound from occurring.

Because the inner peripheral surface of the annular bulge 1b is disposed close to the outer peripheral surface of the valve body 6, a depression 38 is formed in the outer surface of the valve body 6 in the region of the opening of the passage 17, thereby securing a sufficient flow area between the passage 17 and the variable pressure chamber 5.

In operation, when a brake pedal, not shown, is depressed to drive the input shaft 25 and the valve plunger 11 to the left, the valve element 14 becomes seated upon the first valve seat 10 on the valve body 6 to interrupt a communication between the both chambers 5 and 4 while the second valve seat 12 on the valve plunger 11 moves away from the valve element 14 to communicate the variable pressure chamber 5 with the atmosphere. Accordingly, the atmosphere is supplied into the chamber 5, allowing the power piston 2 to be driven forward by a pressure differential thereacross against the resilience of the return spring 35 to effect a braking action, generally in the similar manner as occurring in a conventional brake booster.

If the brake pedal is now released, the second valve seat 12 on the valve plunger 11 becomes seated upon the valve element 14 to interrupt the communication between the chamber 5 and the atmosphere while the valve element 14 moves away from the first valve seat 10 to communicate the variable pressure chamber 5 with the constant pressure chamber 4, allowing the power piston 2 to be returned to its original inoperative position under the resilience of the return spring 35.

When the key member 36 abuts against the left end face of the annular bulge 1b in response to a retracting movement of the power piston 2, the valve plunger 11 which is coupled therewith ceases to retract while the power piston 2 and the valve body 6 continue their retracting movement until the retracting movement of the valve body 6 brings the first valve seat 10 on the valve body 6 close to the valve element 14 to reduce the clearance therebetween to substantially zero, whereupon the valve body 6 abuts against the key member 36 to stop its movement. Alternatively, where the valve body 6 does not abut against the key member 36 and is allowed to retract further, the power piston 2 comes to a stop as a result of the closure of both the first and the second valve seat when the resilience of the return spring 35 is balanced with a pressure differential between the both chambers 5 and 4. Accordingly, the fluid paths within the valve mechanism 7 can be switched immediately whenever the input shaft 25 is driven forward for the next time.

It will be appreciated that because the inner peripheral surface of the annular bulge 1b is disposed very close to the outer peripheral surface of the cylindrical portion 6a of the valve body 6, the length of the key member 36 which abuts against the left end face of the annular bulge 1b can be reduced, thus enabling a reduction in the weight and the wall thickness of the key member as well as a reduction in the weight and the axial length of the brake booster. As mentioned previously, the annular bulge 1b is integrally formed with the cylindrical extension 1a of the shell 1, so that any added cost which might result from the provision of a separate stop member within the cylindrical extension can be suppressed.

It will be appreciated that the seal member 32 is disposed in abutment against the right end face of the annular bulge 1b. When a negative pressure is introduced into the variable pressure chamber 5, the seal member is subject to atmospheric pressure to be urged against the right end face of the annular bulge 1b, thus improving the reliability of the hermetic seal. In addition, a satisfactory sealing effect can be maintained over an increased length of time even in the presence of aging effect of the seal.

In the described embodiment, the annular bulge 1b is formed substantially at the center of the cylindrical extension 1a, but it will be appreciated that the annular bulge 1b may be defined at the left end of the extension 1a. In this instance, the left end face of the annular bulge 1b will be flush with the internal wall surface of the shell 1 in a region thereof which is located radially outward of the bulge, thus permitting the restriction to be eliminated that the length of the key member 36 must be less than the internal diameter of a portion of the cylindrical extension 1a which is disposed forward of the annular bulge 1b.

While the invention has been shown and described above in connection with an embodiment thereof, it should be understood that a number of changes, modifications and substitutions will readily occur to one skilled in the art from the above disclosure without departing from the spirit and scope of the invention defined by the appended claims.

What is claimed is:

1. A brake booster including a shell, a cylindrical extension formed by a rear central portion of the shell which extends in a cylindrical form to be open, a valve body slidably disposed within the shell and having a rear cylindrical portion which slidably extends through the cylindrical extension to the outside thereof, a seal member disposed within the cylindrical extension of the shell to maintain a hermetic seal between the cylindrical extension and the cylindrical portion of the valve body, a valve mechanism received within the valve body, an input shaft mechanically coupled to a valve plunger which forms part of the valve mechanism for switching a flow path within the valve mechanism, and a key member mechanically coupled to the valve plunger for limiting a free retracting movement of the valve plunger when the booster is inoperative, thereby reducing a lost stroke of the input shaft;

characterized in that the cylindrical extension of the shell is integrally formed with an annular bulge extending radially inward from the circumference thereof, the cylindrical extension includes a large diameter portion which has an inner diameter greater than the inner diameter of the annular bulge and which is located rearward of the annular bulge, and the seal member is disposed on the rear side of the annular bulge in the large diameter portion of the cylindrical extension.

2. A brake booster according to claim 1 in which the key member is disposed for abutment against a front end face of the annular bulge to limit a free retracting movement of the valve plunger with respect to the valve body.

3. A brake booster according to claim 1, further including a bearing disposed in sliding contact with the cylindrical portion of the valve body to support it, the bearing being disposed within cylindrical extensions of the shell on the rear side of the seal member.

4. A brake booster according to claim 1 in which in the region of the annular bulge, the cylindrical extension of the shell has an inner diameter at a location forward of the annular bulge which is greater than the diameter at a location rearward of the annular bulge.

5. A brake booster according to claim 1 in which a depression is formed in the cylindrical, outer peripheral surface of the valve body, and leads to a passage which provides a communication between the valve mechanism and a variable pressure chamber defined within the shell.

6. A brake booster according to claim 1, wherein said annular bulge radially overlaps said key member and substantially radially overlaps said seal member and is positioned axially between said key member and said seal member, and wherein said seal member is located in its entirety in said large diameter portion of said cylindrical extension rearward of said annular bulge.

7. A brake booster according to claim 6, wherein said annular bulge has a substantially U-shaped cross section including radially extending front and rear legs connected by an axially extending bight, said seal member being disposed adjacent said rear leg, and wherein said key member is engagable against said front leg during said retracting movement of said valve plunger.

8. A brake booster according to claim 7, wherein said rear leg of said annular bulge has a radial length which i substantially equal to the difference between the inner diameters of said annular bulge and said large diameter portion, wherein said seal member is compressed radially between said valve body and said large diameter portion so as to have a radial thickness which is only slightly larger than the length of said rear leg, and wherein said bight is spaced slightly radially outwardly from said cylindrical portion of said valve body.

* * * * *

UNITED STATES PATENT AND TRADEMARK OFFICE
CERTIFICATE OF CORRECTION

PATENT NO. : 4 936 195

DATED : June 26, 1990

INVENTOR(S) : Shintaro UYAMA

It is certified that error appears in the above-identified patent and that said Letters Patent is hereby corrected as shown below:

Col. 6, line 11; change "within cylindrical extensions" to
---within the cylindrical extension---.

Col. 6, lines 39-40; change "length which i" to
---length which is---.

Signed and Sealed this

Twenty-fourth Day of December, 1991

*Attest:*

HARRY F. MANBECK, JR.

*Attesting Officer*    *Commissioner of Patents and Trademarks*